L. C. PIKE.
LUBRICATING DEVICE.
APPLICATION FILED DEC. 5, 1916.
1,322,611.
Patented Nov. 25, 1919.
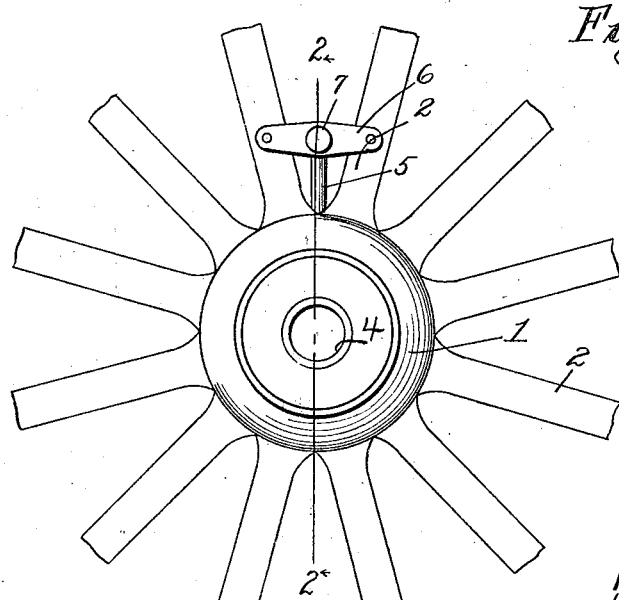
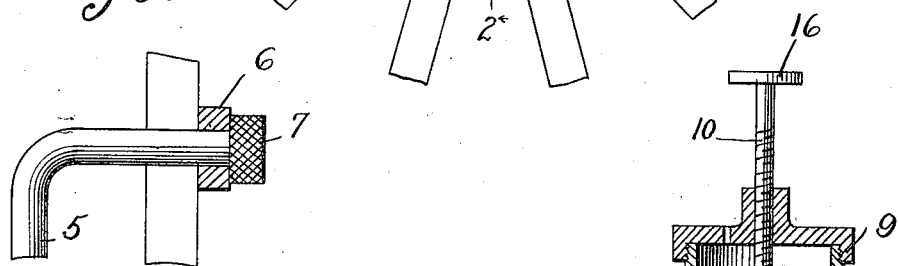
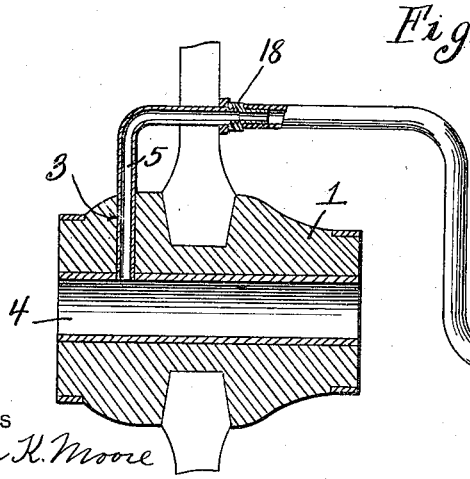
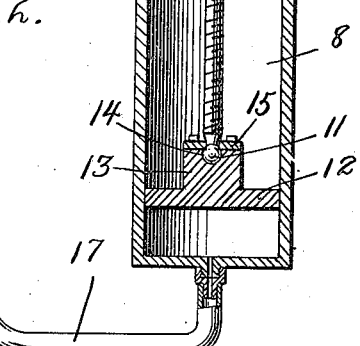
WITNESSES
Arthur K. Moore
Wm. H. Mulligan
INVENTOR
Lewis C. Pike
BY Richard Bowen
ATTORNEY

UNITED STATES PATENT OFFICE.

LEWIS C. PIKE, OF ZELLWOOD, FLORIDA.

LUBRICATING DEVICE.

1,322,611.  Specification of Letters Patent.  Patented Nov. 25, 1919.

Application filed December 5, 1916. Serial No. 135,227.

*To all whom it may concern:*

Be it known that I, LEWIS C. PIKE, a citizen of the United States, residing at Zellwood, in the county of Orange and State of Florida, have invented certain new and useful Improvements in Lubricating Devices, of which the following is a specification.

This invention relates to a lubricating device and the primary object is to provide a device for supplying grease and oil to the axles of a wagon whereby the wheels may be lubricated without the necessity of first removing the wheels from the axle.

One of the objects of the invention is to provide a grease tube permanently associated with each wheel of the vehicle and extending through the hub thereof to communicate with the spindle or axle; the intake opening for the pipe being disposed for receiving a flexible supply pipe carried by the portable grease container.

The invention further contemplates the provision of a portable grease container designed to be removably mounted upon the wagon body, the grease container provided with a means for ejecting the grease through a flexible hose carried by the container and adapted to be connected to the grease tube on the wheel hub whereby the grease may be forced through the flexible hose and into the interior of the hub for profusely lubricating the same.

A further object of this invention is the provision of a lubricating device which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a front elevation of a fragmentary portion of a vehicle wheel showing the grease tube mounted on the hub.

Fig. 2 is a section on the line 2—2 of Fig. 1, showing the flexible hose connected to the grease tube for supplying a quantity of grease to the hub.

Fig. 3 is an enlarged detail view of a portion of the grease tube.

Referring to the drawing, wherein is illustrated the preferred form of my invention, and in which like numerals of reference indicate corresponding parts throughout the several views, the wheel has the usual hub 1 and the spokes 2 radiating therefrom. Adjacent the inner end 1 is a radially extending opening 3 in communication with the interior bore 4 of the hub. A grease tube 5 is extended through the opening 3 and has its end terminating at the wall of the bore 4 thereby establishing communication between the exterior and the interior of the hub. The tube 5 is bent at right angles and has its outer end projected outwardly through the space between two of the spokes 2 and the terminal of the tube is extended through an opening formed in a supporting plate 6 the opposite ends of which are fastened to the adjacent spokes. Outwardly beyond the plate 6, the tube has its extreme terminal screw threaded to receive a cap 7 for closing the same after receiving a supply of grease or lubricant. This arrangement of the pipe of grease tube 5 permits one end of the tube to be disposed at the inner end of the interior bore 4 while the opposite end may be disposed at a convenient point for receiving a lubricant from the outer side of the wheel.

For the purpose of supplying grease to any one of the wheels on the vehicle, I provide a portable grease container 8 constructed in the form of a cylindrical piston. A cap 9 is secured in any preferred manner to the open end of the piston and this cap is adapted to be removed for refilling the container when the same becomes empty. A central screw threaded opening in the cap 9 receives a screw threaded piston rod 10 the inner end of which is provided with a substantially spherical-shaped member 11. A piston 12 is mounted for reciprocatory movement in the cylinder and a stud 13 is integrally formed therewith for receiving the end of the piston 10. The end of the stud is provided with a recess 14 in which the spherical member 11 is rotatably fitted. For retaining the spherical member within the recess 14 I provide a bearing plate 15 adapted to fit over the curved portion of the spherical member where it joins the end of the piston and provided with bolt holes for receiving the fastening bolts which are secured to the end of the stud 13. The outer end of the piston rod 10 carries a handle 16 by which the piston may be rotated.

Detachably connected to the bottom end of the container is a flexible hose 17 which has one end provided with a nipple 18 having interior screw threads for receiving the screw threads on the end of the tube 5.

The portable grease container may be mounted upon any convenient place on the wagon body and when any of the wheels require lubrication, it is merely necessary to detach the grease container from the wagon body and affix the hose to the grease tube 5 through the medium of the nipple 18 as shown in Fig. 2 of the applicant's drawing, whereupon the piston rod may be actuated for forcing the grease out of the container and into the tube 5 thereby supplying grease for freely lubricating the axle or spindle. Rotation of the wheel may continue during supplying of the lubricant to the axle and the portable grease container need not be removed while the nipple is changed from one wheel to another. In this manner the grease container may be permanently fixed, if desired, to any convenient place on the wagon body.

From the foregoing it will be observed that a very simple and durable lubricating device has been provided, the details of which embody the preferred form. I desire it to be understood however, that slight changes in the minor details of construction may be made without departing from the spirit of the invention or the scope of the claim hereunto appended.

I claim:

A lubricating device including in combination with a wheel, the hub of which has provided therein an opening leading from the bore thereof to the outer hub face, of a bracket disposed horizontally across the outer edges of the spokes of the wheel and provided with an opening, an angularly disposed grease tube arranged so that one angular portion thereof engages the opening in the hub while the other angular portion projects in a substantially horizontal plane through the opening in the bracket so as to be approximately parallel to the bore of the hub, and closure means for engaging the projecting end of the tube and adapted upon being tightened thereon, to cause the opposite angular portion of the grease tube to bind against the wall of the opening formed in the hub, and being more rigidly retained therein.

In testimony whereof I affix my signature in presence of two witnesses.

LEWIS C. PIKE.

Witnesses:
 GEO. MORTON,
 E. A. JOHNSON.